United States Patent [19]

Colombie

[11] 3,909,312
[45] Sept. 30, 1975

[54] NON CORROSIVE FLUX FOR SOFT SOLDER

[75] Inventor: Michel Colombie, Saint-Etienne, France

[73] Assignee: Creusot-Loire, Paris, France

[22] Filed: Sept. 12, 1973

[21] Appl. No.: 396,364

Related U.S. Application Data

[63] Continuation of Ser. No. 266,238, June 26, 1972, abandoned.

[52] U.S. Cl. .................. 148/24; 29/495; 148/26
[51] Int. Cl.² .............................. B23K 35/34
[58] Field of Search ............... 75/94; 117/52; 148/23–26; 29/495

[56] References Cited
UNITED STATES PATENTS

| 2,171,041 | 8/1939 | Michel | 148/26 |
| 2,987,817 | 6/1961 | Kozlik | 148/26 |
| 3,010,821 | 11/1961 | Platt et al. | 75/94 X |
| 3,031,346 | 4/1962 | Wasserman et al. | 148/26 |
| 3,330,028 | 7/1967 | Elbreder | 148/26 X |
| 3,597,285 | 8/1971 | Aronberg | 148/26 |
| 3,660,127 | 5/1972 | Aronberg | 148/26 X |

FOREIGN PATENTS OR APPLICATIONS

| 1,141,893 | 2/1969 | United Kingdom | 148/23 |
| 1,025,603 | 4/1966 | United Kingdom | 117/52 |

*Primary Examiner*—Allen B. Curtis
*Assistant Examiner*—Thomas A. Waltz
*Attorney, Agent, or Firm*—Cameron, Kerkam, Sutton, Stowell & Stowell

[57] ABSTRACT

A non corrosive flux for soft solder comprises a mixture of 10% to 90% of ammonia phosphates, 0.5% to 15% of ammonia fluoride and up to 90% resin. The mixture may be diluted and used as an emulsion.

1 Claim, No Drawings

NON CORROSIVE FLUX FOR SOFT SOLDER

This is a continuation of application Ser. No. 266,238, filed June 26, 1972, now abandoned.

BACKGROUND OF THE INVENTION

The present invention relates to non corrosive flux for soft soldering of metals and alloys, particularly of stainless metals or alloys.

"Non corrosive fluxes" are fluxes which after joining the soldered parts, leave residues which do not cause subsequent noticeable corrosion if they have not been removed.

A "soft solder" is a joint made by using metals which melt at a low temperature, between 80°C. and 400°C., and most commonly between 150°C. and 250°C., made to flow between the parts which are to be joined.

The heat source for the melting of the added metal may be a flame, a pointed soldering iron heated electrically or with a flame, high or low frequency induction, a furnace for liquid flux bath, etc.

The added metals for soft solder, pure or alloys, contain one or more of the following metals: tin, lead, zinc, cadmium, antimony, bismuth, silver, copper, gold, platinum, palladium, indium, etc.

It is known that the so-called "stainless" steels and alloys contain generally more than 8% chromium, and that they are easily joined by means of soft solder, particularly with pure tin, tin-silver, tin-lead, by using as fluxing compositions, for the wetting of the surfaces which are to be joined with the liquid added metal, mixtures which are rich in metallic chlorides, for instance, the eutectic composition zinc chloride: 72% amonium chloride: 28% addition of one or more fluorides if so desired.

It is known that the traces of flux which may remain after a soft solder operation, may cause in the long run corrosion and particularly spot corrosion, which endangers the strength of the joint.

To date many non corrosive flux compounds have been proposed, containing no chlorides, but they have a very unsatisfactory wetting action, and can only be used for stainless steels and alloys containing chromium-nickel.

The following are examples of fluxing mixtures: phosphoric acid + alcohol + resin, which provides a certain wetting of austenetic nickel-chromium steels, by pure tin, by the eutectic: tin — 3% silver (melting point 221°), by tin-lead, without the soft metal entering in the interstices, and is best used for fillet soldering without penetration.

Furthermore these flux mixtures are totally inactive upon stainless steels with 8% to 30% chromium and without nickel.

SUMMARY OF THE INVENTION

The present invention provides soft non corrosive fluxes having an excellent wetting of almost all stainless steels and alloys containing chromium, with or without nickel, by an appropriate added metal.

To this end, the present invention relates primarily to soft non corrosive fluxes for joining by soldering or brazing steels or alloys, and particularly chromium stainless steels or alloys with or without nickel, the fluxes being an emulsion of a mixture of ammonia phosphates or ammonium fluoride, the phosphates and fluoride can be introduced either as salts, or by a more or less complete neutralization of phosphoric or fluorhydric acids, with the possibility of keeping in a free state a certain proportion of each one of the two acids and the ammonia, whereby the mixture may or may not be diluted in water, or in different alcohols or other organic compounds.

According to the invention, the preceding mixture may also contain resin.

A special feature of the invention is that the mixtures which constitute the flux, without dilution, have a percentage of ammonia phosphates between 10% and 90%, a percentage of ammonia fluoride between 0.5% and 15%, and a maximum resin percentage of 90%.

Preferably, but not necessarily, the mixture has a percentage of monoammonia phosphate from 6% and 12%, a percentage of diammonia phosphate from 60% and 70%, a percentage of ammonia fluoride between 2% and 5% and a pulverized resin percentage between 20% and 30%.

A further particular feature of the invention is that the mixture constituting the flux includes one or more phosphates of heavy metals, selected among the following metals: tin, lead, zinc, indium, cadmium, silver, nickel, cobalt, copper, antimony, bismuth, etc. and these phosphates can be introduced either as salts or through a more or less complete combination of the metal or a metallic compound with phosphoric acid, with the possibility of preserving in a free state a certain proportion of the acid, the metal or the metallic compound.

According to another special feature of the invention, the flux with phosphate of the heavy metals, without dilution, has a percentage of ammonia phosphates between 10% and 80%, ammonia fluoride from 0.5% to 15%, a resin percentage from 5% to 80%, and a percentage of heavy metal phosphates from 5% to 30%.

According to another special feature of the invention, the flux with phosphate of heavy metals does not contain resin, and has a percentage of ammonia phosphates from 10% to 80%, a percentage of ammonia fluoride from 0.5% to 15% and a percentage of phosphate of heavy metals from 10% to 40%.

According to another special feature of the invention, the heavy metals include at least tin, copper or nickel in the case of a flux to be used for brazing of chromium ferrous steels, and a certain proportion of the acids, ammonia, heavy metals or their metallic compounds remain in the free state.

The invention also includes various methods of preparing the fluxes described above.

For the fluxes which do not contain heavy metal phosphates, one method of preparation according to the invention is to gradually add a mixture of concentrated orthophosphoric acid, and ammonia fluoride and resin powder to the solution of ammonia.

Preferably but not necessarily the preceding method can be carried out by adding progressively a mixture of 65% to 75% concentrated orthophosphoric acid at 85% concentration, with 3% to 6% ammonia fluoride and 25% to 35% of powdered resin, to an ammonia solution having an approximate density of 0.92, concentrated to approximately 20.5% of ammonia, in a quantity equal to or slightly greater than the mass of the above-mentioned mixture.

For the fluxes including one or more heavy metal phosphates, a method of preparation according to the invention comprises dissolving the heavy metals in concentrated orthophosphoric acid with heat, then adding to this solution a solution of ammonia, the solution thus obtained is brought to a boil until it reaches a thick consistency, it is then cooled and ammonia fluoride is added with or without an addition of powdered resin.

The non corrosive flux mixtures of the invention provide excellent wetting by pure tin, eutectic tin — 3% silver, by tin-lead, etc. of almost all the chromium stainless steels and alloys, with or without nickel. The soft metal penetrates in the smallest interstices forming the finest joints.

The application of soft soldering on stainless steels was limited until now to applications where the complete elimination of flux residues, by means of brushing and repeated rinsing with water did not present any difficulties, as for instance in the construction of appliances, such as household refrigerators, or small assemblies.

With the non corrosive fluxes according to the present invention, the applications mentioned above, are no longer subject to cumbersome cleaning procedures and can be expanded.

In addition, a very important area of application for the fluxes of the present invention will be in the construction industry, and generally field activities, where the soft solder, which only requires light and inexpensive tools, and unskilled personnel, is an ideal means of joining, provided that the flux used is non corrosive, because, obviously, there is no need of removing it completely after soldering.

By means of the flux of the present invention, it is possible to use in the above-mentioned applications a much greater number of stainless steels, namely, inexpensive stainless steels containing chromium without nickel, which can replace other metals like copper, lead or galvanized iron and plastics, etc. and having the advantages of being economical, mechanically solid and esthetic.

It is therefore of great advantage to manufacture in stainless steel, joined with soft solder, tubular structures for water distribution piping as well as the sanitary installations, decorative structures, decorative motifs and the like.

DESCRIPTION OF PREFERRED EMBODIMENTS

The following examples, which are in no way limiting, describe ten ways of preparing fluxes according to the present invention.

The two first examples relate to fluxes without heavy metal phosphates; the last seven examples concern fluxes with stannous phosphate, with or without lead phosphate.

First example: The components are mixed in the stated proportions:

| | |
|---|---|
| monoammonic phosphate: | 8% |
| diammonic phosphate: | 65% |
| ammonia fluoride: | 3% |
| pulverized resin: | 24% |

This mixture may be left dry, or may be diluted in water, or applied in form of paste or milky emulsion.

Second example: The following components are mixed in the following proportions:

| | |
|---|---|
| orthophosphoric acid at 85% solution: | 69.4% |
| ammonia fluoride: | 3.6% |
| powdered resin: | 27% | and very gradually to this mixture is added 1 to 12 times the weight of the mixture, of a solution of ammonia with a density of 0.92 to 20.5% of $NH_3$.

A reaction takes place which releases heat and leaves as a final product a milky emulsion.

Third example: The following components are mixed in the following proportions:

| | |
|---|---|
| monoammonic phosphate: | 7% |
| diammonic phosphate: | 54% |
| ammonia fluoride: | 3% |
| Stannous phosphate: | 15% |
| pulverized resin: | 21% |

This mixture may be left dry, or may be diluted in water, or may be paste, or a milky emulsion.

Fourth example: The following components are mixed in the following proportions:

| | |
|---|---|
| orthophosphoric acid at 85% solution: | 58% |
| ammonia fluoride: | 3% |
| stannous phosphate: | 15% |
| pulverized resin: | 24% | and to this mixture is very gradually added 1 to 12 times the weight of the mixture of an ammonia solution of density 0.92 to 20.5% of $NH_3$.

Fifth example: 10 grams of tin are dissolved with heat in 100 grams of orthophosphoric acid at 85% solution.

Then 215 g of ammonia are added at 22° Baume.

The solution is then boiled until it reaches a pasty consistency with the final weight being reduced to 140 g.

After cooling 40 g., of ammonia fluoride are added.

Sixth example: The same as example five, but replacing 10 grams of tin by 9 grams of tin and 1 gram of lead.

Seventh example: Same as the fifth example, but replacing 10 grams of tin with a mixture of tin-lead having a total weight of 10 g., the proportions of lead and tin may be in any desired proportions.

Eighth example: Same as the fifth example, with a supplementary addition to the final product of 1.5 g. of lead acetate.

Ninth example: Same use as the fifth example, with the addition to the final product of 0.5 g. to 10 g. of lead acetate.

Tenth example: A flux especially designed for soldering or brazing of chromium ferrous steels using a choice of heavy metals, tin, nickel and copper having a composition without dilution:

| | | | |
|---|---|---|---|
| Tin: | 6 to 7% | orthophosphoric acid at 85% solution | : 60/65% |
| Nickel: | 0.5 to 1.5% | ammonia fluoride | : 10/15% |
| Copper: | 0.1 to 0.5% | ammonia: 20/22° Baume | : 15/20% |

What is claimed is:

1. A non-corrosive soft solder flux particularly adapted for joining steels or alloys which may contain chromium by soldering or soldering or brazing consisting essentially of an emulsion of a mixture of ammonium phosphate, tin, nickel and copper phosphates and ammonium fluoride and having the following undiluted composition:

| | |
|---|---|
| tin | 6 to 7% |
| nickel | 0.5 to 1.5% |
| copper | 0.1 to 0.5% |
| ortho phosphoric acid (85% solution) | 60 to 65% |
| ammonium fluoride | 10 to 15% |
| ammonia 20/22° baume | 15 to 20% | wherein said emulsion may contain free ammonia, free ortho phosphoric acid, free hydrofluoric acid, free tin, free nickel or free copper.

\* \* \* \* \*